United States Patent
Boeder et al.

(10) Patent No.: US 7,619,869 B2
(45) Date of Patent: Nov. 17, 2009

(54) ELECTRICAL CIRCUIT BREAKER

(75) Inventors: Franz Boeder, Ahrbrueck (DE);
Andreas Schumacher, Dattenberg (DE);
Volker Friedrich, Roth (DE)

(73) Assignee: Moeller GmbH, Bonn (DE)

( * ) Notice: Subject to any disclaimer, the term of this patent is extended or adjusted under 35 U.S.C. 154(b) by 137 days.

(21) Appl. No.: 11/773,538

(22) Filed: Jul. 5, 2007

(65) Prior Publication Data

US 2008/0006607 A1  Jan. 10, 2008

(30) Foreign Application Priority Data

Jul. 4, 2006  (DE)  .................. 10 2006 030 672

(51) Int. Cl.
*H02H 3/00* (2006.01)
(52) U.S. Cl. ......................... 361/115; 361/42
(58) Field of Classification Search ................ 361/42, 361/44, 115
See application file for complete search history.

(56) References Cited

U.S. PATENT DOCUMENTS

| 2,924,752 | A | * | 2/1960 | Scott, Jr. ....................... 361/12 |
| 4,949,214 | A | * | 8/1990 | Spencer ........................ 361/95 |
| 5,168,137 | A | * | 12/1992 | Hufnagel et al. ......... 200/50.02 |
| 7,145,757 | B2 | * | 12/2006 | Shea et al. ..................... 361/2 |
| 2008/0007881 | A1 |  | 1/2008 | Boeder et al. |

FOREIGN PATENT DOCUMENTS

| DE | 6906985 | 1/1970 |
| DE | 4110335 | 10/1992 |
| DE | 4404074 | 8/1995 |
| DE | 4438593 | 5/1996 |
| DE | 19712387 | 10/1997 |
| DE | 19643607 | 11/1997 |
| DE | 10113698 | 10/2001 |
| DE | 10254497 | 6/2004 |
| DE | 10313045 | 7/2004 |
| DE | 69930494 | 11/2006 |
| EP | 0414657 | 2/1991 |
| EP | 0575932 | 12/1993 |
| EP | 1052665 | 11/2000 |
| WO | WO-0002320 | 1/2000 |
| WO | 0062320 | 10/2000 |

OTHER PUBLICATIONS

European Search Report for EP 1 876 626, dated Apr. 28, 2008.

* cited by examiner

*Primary Examiner*—Danny Nguyen
(74) *Attorney, Agent, or Firm*—Darby & Darby

(57) ABSTRACT

A circuit breaker for multi-phase power includes an opening-closing apparatus configured to open and close each phase of the multiphase power, a detection unit configured to detect a fault current in at least one phase of an electrical installation, a plurality of connecting bars disposed on a load side of the circuit breaker, and a fastening device disposed on the connecting bars and configured to detachably fasten a short circuiter to the connecting bars, the short circuiter configured to create a short circuit between the connecting bars when a fault is detected by the detection unit. The option proposed according to the invention of installing a short circuiter means that the circuit breaker is fully operational, either with or without the installation of a short circuiter.

8 Claims, 3 Drawing Sheets

ELECTRICAL CIRCUIT BREAKER

Priority is claimed to German Patent Application No. DE 10 2006 030 672.4, filed on Jul. 4, 2006, the entire disclosure of which is incorporated by reference herein.

The present invention relates to an electric circuit breaker, especially to a power breaker for low voltage.

BACKGROUND

When a fault current occurs, especially an overcurrent, or when a short-circuit or an arcing fault occurs, the current-breaking capacity and turn-off time of a power breaker are dependent on various parameters. The turn-off process is made up of the tripping time, the inherent delay and the turn-off time. The tripping time is the time from the occurrence of the variable that causes the tripping until the initiation of the tripping process, for instance, the release of a breaker latch. This is followed by the inherent delay of the circuit breaker, which is determined by the dynamic processes of the contacts of the circuit breaker as they move and open. A turn-off time of about 30 to 50 msec is expected in a circuit breaker for the higher power range (rated current up to 6300 A).

Severe injury to persons and/or material damage can result from the occurrence of an arcing fault in an electrical installation, so this should be prevented to the greatest extent possible. In order to limit such injury or damage, several measures have been proposed, of which the optimal solution is to interrupt (to extinguish) the arcing fault in a shorter time than the turn-off time of the incoming circuit breaker.

It is a known procedure to use short circuiters to interrupt arcing faults in electrical installations. Various systems that detect physical effects of the burning arc (light, sound, pressure) can be used in such an arrangement for extinguishing an arcing fault. A proven system is based on the optical detection of an arc (EP 0575 932 B1). In order to switch off the arc, various short circuiter arrangements are proposed, for example, the use of a pyrotechnically driven short circuiter (EP 1052 665 B1 or WO 200062320 A1), by means of a short-circuit to be produced by thyristors (DE 4438593 A1) or by using a vacuum interrupter (DE 4404074 A1). Such short circuiters produce a short-circuit between the phases of the electric power system, between which the arc burns, so that the arcing fault can be extinguished within a period of time shorter than 3 msec.

After the short circuiter has been tripped, a short-circuit current is still flowing that is interrupted by the serially connected incoming circuit breaker (after its turn-off time), as a result of which the defective electrical installation is ultimately disconnected from the electric power system.

The advantage of an arc detection and extinguishing system is obvious. However, the special effort involved in the installation of an optical arc detection system with optical waveguides and corresponding opto-electronics is quite considerable. Consequently, in some electrical installations, the use of an arc detection and extinguishing system is sometimes dispensed with for cost reasons—in spite of the obvious advantages.

SUMMARY OF THE INVENTION

An object of the present invention is to expand a circuit breaker with a configuration that facilitates the later use of an arc detection and extinguishing system.

An aspect of the present invention is that, at least on the load side of the circuit breaker, fastening means are arranged on the connecting bars for purposes of detachably fastening a short circuiter in order to produce a short circuit between the conductor bars if a fault current is detected by a fault current detection unit. The mentioned fastening means can also be configured on the electric power system side of the circuit breaker so that, when the circuit breaker is used, the option exists to decide to install a short circuiter on the electric power system side or on the load side.

With the invention, the user of the circuit breaker is given the option of an expanded function for its use.

The fastening means should be suitable for simple, quick and detachable fastening. For example, a tension-lever system can be employed with which—without screwed connections—the short circuiter can be securely clamped onto the connecting bars. As an alternative, it can also be provided that the connecting bars of the circuit breaker have threaded bolts that correspond with connecting points in the short circuiter where, for instance, bores are provided which can be slid over the threaded bolts. The fastening is then effectuated using screws (optionally with washers).

It is evident that it is advantageous, along with the installation of a short circuiter, to likewise install an arc-detection system in the electrical installation. In a "simplified" version, however, the detection of a fault current can be limited exclusively to the use of a short-circuit detector (current transformer and short-circuit actuator) in the circuit breaker. It should be clear to the person skilled in the art that this configuration can only be the lowest stage of a safety system against installation malfunctions.

The typical use of a short circuiter involves its insertion and fastening on the load side of the circuit breaker. In this manner, the short circuiter is situated between the circuit breaker and the actual electrical installation (for instance, a switching or distribution station, a transformer station, an electrical motor) and it disconnects the installation from the electrical power system in case of the occurrence of a short circuit.

However, a short circuiter can also be installed on the electric power system side of the short circuiter. Thus, in the case of an "extensive protection situation", two short circuiters can also be present, one before and one after the circuit breaker. The use of the circuit breaker on the electric power system side entails the advantage that the entire connection area (transformer, cables, bars) is situated "before the circuit breaker" in the monitoring zone of the short circuiter. If an arcing fault occurs in the connection area, an activated short circuiter extinguishes the arcing fault and the upstream, superordinated incoming circuit breaker then has the "task" of interrupting the short-circuit that is present.

The arrangement can be expanded in this manner if a detection means for an arcing fault is also arranged in the connection area. As mentioned, such a detection means can be an optical waveguide sensor or else one or more photodiodes. Their detection signal can be transmitted to one or both of the short circuiters that are located in the circuit breaker.

The option proposed according to the invention of installing a short circuiter means that the circuit breaker is fully operational, either with or without the installation of a short circuiter.

An insertion shaft can be associated with the fastening means, that is to say, the fastening site is configured as a shaft into which a short circuiter can be inserted. The location of the fastening should be accessible from the outside at all times, but for safety reasons, this location should be designed so that it can be locked. Preferably, the fastening site can be configured so that it can be locked with a cover or a lid. For security purposes, it is also possible to provide lead seals for the closure means of the insertion shaft. Then a short circuiter can only be installed after the lead seal has been destroyed.

It is likewise proposed that means be provided for placing a lead seal on a short circuiter that has been installed in the insertion shaft. In this manner, the short circuiter can be secured against unauthorized removal.

Additional advantageous embodiments of the invention will be presented below.

Electrical contact means should be present in the insertion shaft that are suitable to accommodate electrical counter-contact means arranged on the short circuiter. It is via the contact means that the short circuiter can be controlled by the circuit breaker or by an electronic module present in the circuit breaker. The electrical contact means (for instance, plugs and sockets) are automatically coupled when the short circuiter is slid into the insertion shaft.

Electrical output data, operating parameters, settings and/or tripping signals can be transmitted between the circuit breaker and the short circuiter via the contact means.

The circuit breaker can have a blocking device that prevents the circuit breaker from being switched on again, said blocking device becoming operational after the switching function has been actuated in the short circuiter.

As mentioned in the introduction, several types of short circuiter are known. The person skilled in the art will be able to determine and select a short circuiter that is well-suited for the envisaged purpose. Preferably, a pyrotechnically driven short circuiter is recommended. A chemical mechanism on the basis of nitrocellulose can be provided to drive it. The connecting bars in the short circuiter form a sandwich-like packet. The pyrotechnical drive propels a metal bolt through the stack of connecting bars so that the phases are mechanically contacted with each other in less than 1 msec and a short-circuit is produced. In a situation where the short-circuit is present in the form of a burning arcing fault, energy is removed from the arc, thus extinguishing it.

The short circuiter should short-circuit at least two phases of the power connection. Technical experts are also considering the approach of configuring the short circuiter to be grounded so as to contact at least one phase of the power connection (configured to switch to one-phase grounding). Both embodiments can be employed.

As is normally done, the circuit breaker is equipped with an electronic detector to detect a fault current on the load side in at least one phase. For this purpose, a current transformer can be present that is designed to detect a fault current on the load side in one of the phases. When a pre-specified threshold for the rate of current rise and/or for the current intensity has been exceeded, an appropriate signal is transmitted via the contacts at the fastening site in order to activate the short circuiter. A built-in short circuiter would then produce short circuit.

The operating state of the short circuiter is maintained by an energy storage unit (for example, by a capacitor battery) whose stored energy is sufficient to actuate (ignite) the short circuiter drive. The charge of the energy storage unit should be permanently present. Consequently, it is advantageous if a permanent power supply is available for the energy storage unit. This should be independent of the electric power system to which the electrical installation and the circuit breaker are connected. The power supply can be configured so as to be battery-powered or else as a supply source from a parallel electrical power system. In the case of the battery-powered variant, it must be ensured that the battery is always in its fully charged state, which can be best achieved by automatically monitoring the charge.

As long as the short-circuit is still present in the short circuiter, it should not be possible to switch the circuit breaker back on. Switching the circuit breaker back on should only be possible once the short-circuit has been eliminated, which can be done by exchanging the short circuiter with a properly functioning short circuiter or by replacing the non-functioning parts or else by not replacing the short circuiter. This achieves a high level of protection for persons and equipment.

The circuit breaker can be used in practically all conventional switchgear cabinets of electrical installations. The installation and start-up of the short circuiter in the circuit breaker can be carried out quickly and simply. The result is a compact unit. It does not require additional space. For these reasons, the circuit breaker can replace existing switching systems within the scope of a retrofitting procedure.

The conductors and the conductor bars of the circuit breaker and short circuiters should be dimensioned for a short-circuit current of more than 100 kA over a time span of up to 500 ms. With this stipulation, in the case of certain design configurations of the electrical installation, the criteria demanded for the installation in terms of its ability to withstand short-circuits can be lowered. Up until now, it has been assumed that conductor bars, bar supports and other current-carrying parts had to be dimensioned for the maximum anticipated short-circuit current. With the option of using a short circuiter as proposed according to the invention, the short circuiter switches off the electrical installation within 2 msec. The short-circuit load on the installation is thus minimized. Therefore, it is no longer necessary to fulfill the requirement for a maximum ability to withstand short-circuits that would otherwise exist for an electrical installation. This naturally translates into financial advantages for the installation operator.

BRIEF DESCRIPTION OF THE DRAWINGS

Additional details and advantages of the invention ensue from the embodiments explained below with reference to the figures. The following is shown.

DETAILED DESCRIPTION

Figures 1A, 1B:
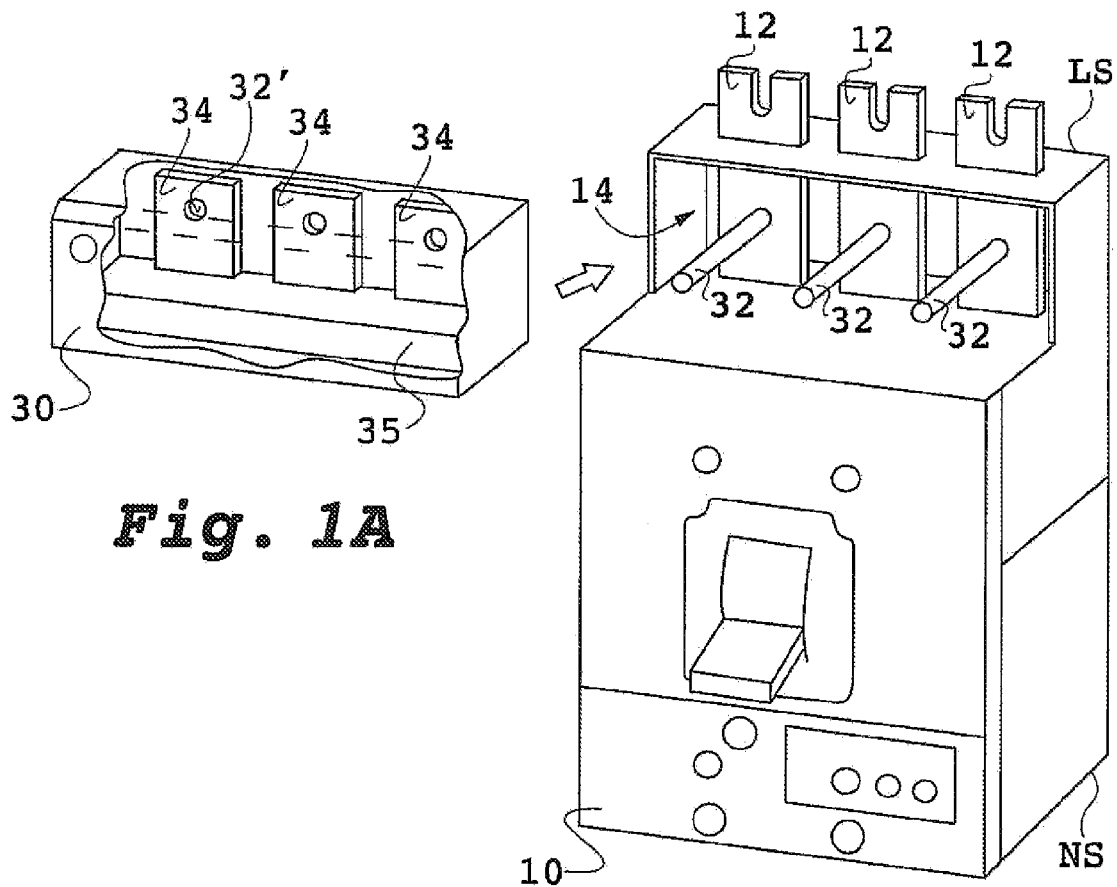
FIGS. 1A and 1B—a perspective view of the circuit breaker and short circuiter.

The depictions in the figures show a circuit breaker configured as a power breaker 10 that is installed in a three-phase (L1, L2, L3) electrical power system upstream from an electrical consumer 40. The circuit breaker has a detection unit (short-circuit actuator) and an overload release that can be configured as a bimetal release. Overload releases operate with a time delay when a high, pre-adjustable current intensity occurs and cause the contacts of the circuit breaker to open via the breaker latch 16. The provided detection unit 20 is present in the form of an electronic unit that is actuated by the current-detection means 21. Current transformers, for instance, Hall sensors, can be provided as the current-detection means.

The circuit breaker is contained in such a way that a short circuiter can be connected to at least one fastening site.

For this purpose—according to FIG. 1B—on the load side LS of the circuit breaker, the conductor bars 12 of each phase L1, L2, L3 are accessible and provided with means 32 (here threaded bolts) so that the short circuiter 30 can be detachably installed (contacting, fastening, joining, screwing). The short circuiter 30 is suitable to electrically connect the three phases (L1, L2, L3) among each other. It can short-circuit the conductor bars 12 among each other.

Figure 3:
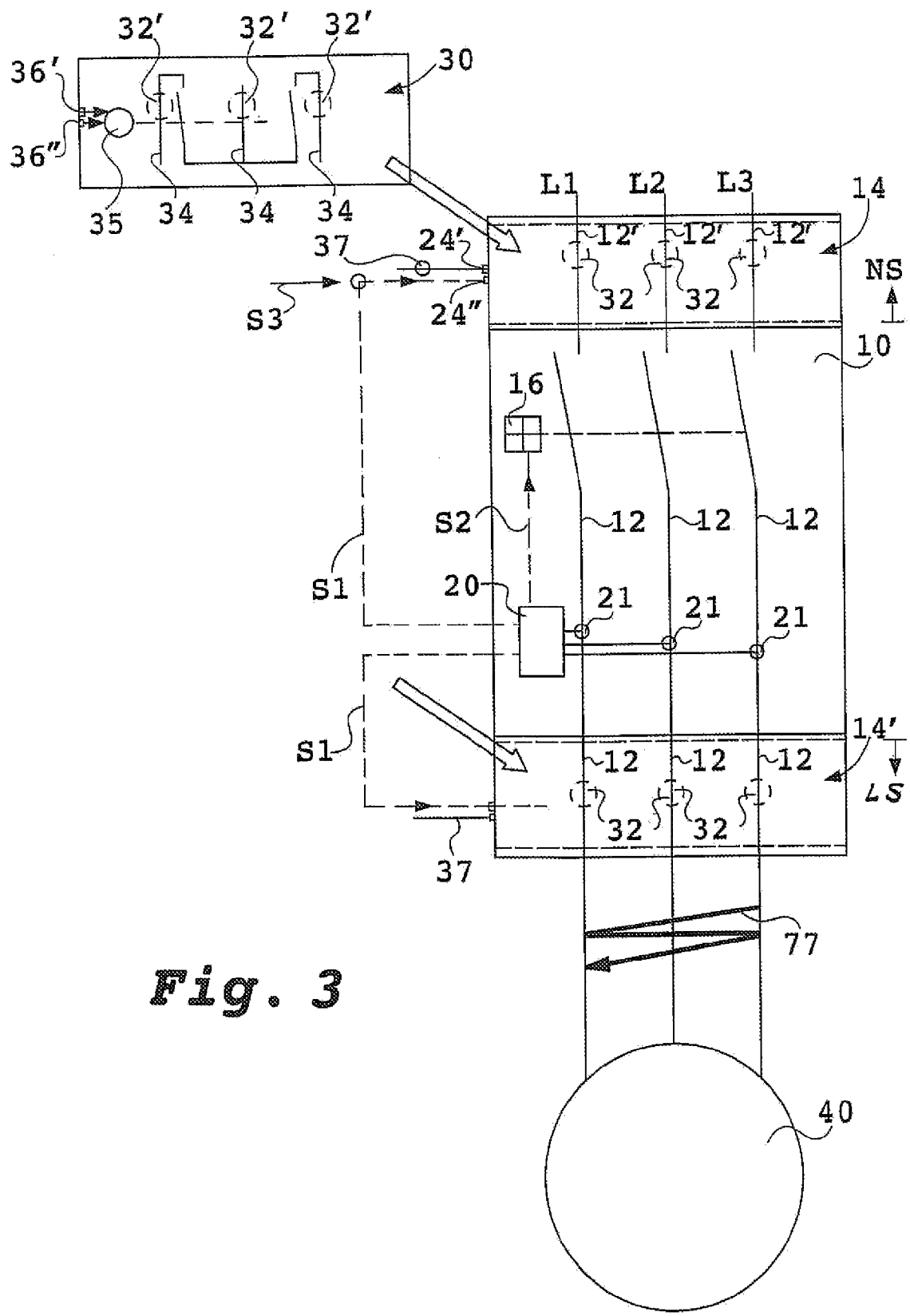
FIG. 3—a schematic circuit diagram of a short circuiter and circuit breaker combination.

In the arrangement according to FIG. 1, the circuit breaker is supplied from the bottom (on the electrical power system side); in contrast, in FIG. 3, the supply side is (schematically) indicated as being located at the top.

An insertion shaft 14 is present as a fastening site for a short circuiter. The housing of the circuit breaker—as shown in the figure depiction—is configured with an integrated insertion shaft. The design and the geometry of the housing of the short circuiter are adapted to the housing of the circuit breaker or to the insertion shaft. A cap with a lead seal to cover an insertion shaft should be present—when the short circuiter is not installed.

In another embodiment, it is also possible to dispense with a separate configuration of the housing if it is only provided that a short circuiter 30 can be fastened (flanged) to the connecting bars of the circuit breaker. The housing of the circuit breaker does not necessarily have to be configured with an integrated insertion shaft.

The possibility of inserting and installing a short circuiter is indicated in the figures by means of arrows.

Figure 2:
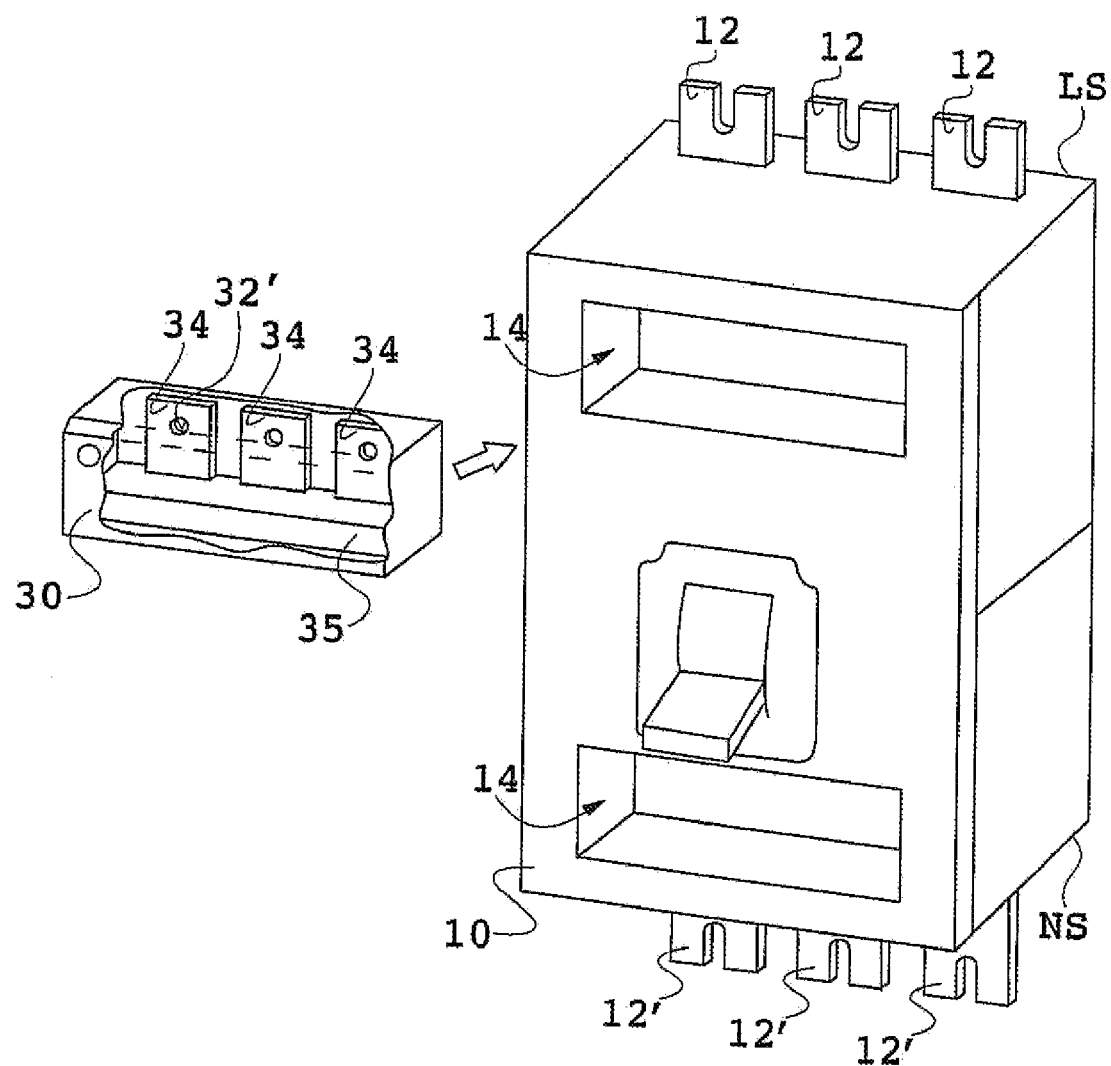
FIG. 2—a circuit breaker with two schematically depicted compartments.

Preferably, two insertion shafts 14, 14' can also be configured, as is indicated at the top and bottom of FIG. 2. Thus, a short circuiter 30 can be installed on the electric power system side NS of the circuit breaker as well as on the load side LS of the circuit breaker. It should be noted that, in FIGS. 1 and 2, the load side LS is at the top and in FIG. 3 the load side LS is at the bottom.

In FIG. 1A, a pyrotechnical generator in the short circuiter is shown with the reference numeral 35. The connecting bars 34 of the short circuiter 30, in which the bores 32' are present, are contacted, and thus connected in parallel, with the conductor bars 12, 12' at the fastening sites. The "normal" function of the circuit breaker is independent of whether or not a short circuiter 30 in installed. The short circuiter 30 is tripped by the occurrence of a fault current, primarily in the case of a short-circuit in the electrical installation 40.

FIG. 2 shows a perspective view with two schematically depicted compartments 14' on the load side LS (top) as well as (14) on the electrical power system side NS (bottom), where fastening means can be present for the installation of the short circuiter 35.

The circuit diagram of the circuit breaker is schematically shown in FIG. 3.

A short-circuit is detected by the electronic detection unit 20 of the power breaker (short-circuit actuator), but not by the overload release. The core of the detection unit 20 is a current transformer 21. As a short-circuit actuator, mechanical switchgear normally makes use of a magnetic actor through which current flows and which, in case of a short circuit, mechanically brings about a release of the breaker latch due to the resultant magnetic forces, thus causing the circuit breaker to switch off.

The detection unit is set at pre-specified values (threshold) for the rate of current rise and for the current intensity. If a pre-specified threshold is exceeded, for instance, if an arcing fault 77 occurs, the detection unit 20 sends a signal (S1, S2) to the short circuiter 30 as well as to the breaker latch, said signal containing the "command" S2 to open the contacts of the circuit breaker 10.

Parallel to the electronic tripping signal S1 to the switch, the latch 16 of the circuit breaker receives the "command" S2 to open the contacts. Now the turn-off time of the circuit breaker begins and, at the end of this time, the short circuiter (and the downstream electrical installation 40) that led to the short-circuit is disconnected from the electrical power system.

In the insertion shaft, electrical contact means 24', 24" are present that are suitable to accommodate electrical counter-contact means 36', 36" arranged on the short circuiter. The electrical contact means (for instance, plugs and sockets) are automatically coupled when the short circuiter is inserted into the insertion shaft.

After a switching operation of the short circuiter 30, it is provided that a blocking device that prevents the circuit breaker from being switched back on is made operational. The blocking function can be configured to operate mechanically or electromechanically.

In order to re-start the electrical installation, the short circuiter should be replaced by a new, properly functioning short circuiter. The blocking function is eliminated in this process. The circuit breaker is equipped to switch a short-circuit current multiple times, so that the circuit breaker can continue to be operated if a fault current occurs several times.

A detection unit for arcing faults is not shown in greater detail. Reference to such a detection unit (EP 0575 932 B1) was already made in the introduction. Here, an optical unit with optical waveguides is employed that is coupled to a parallel current detection mechanism (for instance, by means of Hall sensors). When the discharge of the arcing fault occurs and with the fast rise in the fault current caused by the arc, a switching signal S3 is sent by the arcing-fault detector to the short circuiter which is then put into action.

What is claimed is:

1. A circuit breaker for multi-phase power comprising:
an opening-closing apparatus configured to open and close each phase of the multiphase power;
a detection unit configured to detect a fault current in at least one phase of an electrical installation being protected by the circuit breaker;
a plurality of connecting bars disposed on a load side of the circuit breaker;
a fastening device disposed on the connecting bars and configured to detachably fasten a short circuiter to the connecting bars, the short circuiter configured to create a short circuit between the connecting bars when the fault current is detected by the detection unit;
an insertion shaft for receiving the short circuiter; and
an electrical contact element disposed in the insertion shaft and suitable to accommodate an electrical counter-contact element disposed on the short circuiter.

2. The circuit breaker as recited in claim 1, further comprising a plurality of second connecting bars disposed on a electric power system side of the circuit breaker and a second fastening device is disposed on the second connecting bars.

3. The circuit breaker as recited in claim 1, wherein the insertion shaft is lockable.

4. The circuit breaker as recited in claim 3, wherein the contact element is configured to transmit electric power and operating variables between the circuit breaker and the short circuiter.

5. The circuit breaker as recited in claim 1, further comprising a blocking device, wherein after an actuating of a switching function in the short circuiter, the blocking device prevents the circuit breaker from being switched on again.

6. The circuit breaker as recited in claim 1, further comprising a detection unit for a fault current disposed on the electric power system side in a connection area of the circuit breaker.

7. The circuit breaker as recited in claim 6, wherein the circuit breaker is configured for low voltage power.

8. A circuit breaker for multi-phase power comprising:

an opening-closing apparatus configured to open and close each phase of the multiphase power;

a detection unit configured to detect a fault current in at least one phase of an electrical installation being protected by the circuit breaker;

a plurality of connecting bars disposed on a load side of the circuit breaker;

a fastening device disposed on the connecting bars and configured to detachably fasten a short circuiter to the connecting bars, the short circuiter configured to create a short circuit between the connecting bars when the fault current is detected by the detection unit;

a contact element configured to transmit electric power and operating variables between the circuit breaker and the short circuiter; and an insertion shaft for receiving the short circuiter, wherein the insertion shaft is lockable.

* * * * *